(12) United States Patent
Zhang et al.

(10) Patent No.: US 10,309,519 B2
(45) Date of Patent: Jun. 4, 2019

(54) BAFFLE FOR AUTOMOTIVE TRANSMISSION

(71) Applicant: Ford Global Technologies, LLC, Dearborn, MI (US)

(72) Inventors: Dengfu Zhang, Northville, MI (US); Mark Steward, Ann Arbor, MI (US); Lisa Jamieson, Davisburg, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 15/435,703

(22) Filed: Feb. 17, 2017

(65) Prior Publication Data

US 2018/0238434 A1     Aug. 23, 2018

(51) Int. Cl.
  *F16H 7/06* (2006.01)
  *F16H 57/04* (2010.01)
  *F16H 57/05* (2006.01)

(52) U.S. Cl.
  CPC .......... *F16H 57/0423* (2013.01); *F16H 7/06* (2013.01); *F16H 57/05* (2013.01)

(58) Field of Classification Search
  CPC .. F16H 57/0423; F16H 57/0457; F16H 57/05; F16H 57/0447; F16H 57/045
  USPC ........................ 474/144; 184/6.12, 11.3, 15.1
  See application file for complete search history.

(56) References Cited

U.S. PATENT DOCUMENTS

| | | | | |
|---|---|---|---|---|
| 1,161,724 A | * | 11/1915 | Pierce | F16H 57/0421 184/11.1 |
| 1,483,830 A | * | 2/1924 | Moore | F16N 39/06 184/11.1 |
| 1,771,346 A | * | 7/1930 | Perry | F16H 57/0456 184/15.1 |
| 1,960,693 A | * | 5/1934 | Bryant | F16H 57/0421 184/13.1 |
| 1,998,682 A | * | 4/1935 | McCann | B62J 31/00 184/15.1 |
| 3,012,632 A | * | 12/1961 | Bradley | B62J 31/00 184/15.1 |
| 3,529,698 A | * | 9/1970 | Nelson | B61C 17/08 184/11.2 |
| 4,630,711 A | * | 12/1986 | Levrai | F16H 57/0447 184/11.1 |

(Continued)

FOREIGN PATENT DOCUMENTS

DE          4414000 C1      1/1996

*Primary Examiner* — Henry Y Liu

(74) *Attorney, Agent, or Firm* — David Kelley; Brooks Kushman P.C.

(57) ABSTRACT

A baffle for a transmission of a vehicle is provided. The transmission includes a gearbox that outputs torque to a differential, which distributes the torque to the wheels. A chain transfers the torque from the transmission to the differential. A baffle is provided adjacent to, but spaced from, the chain to contain and direct at least some of the lubricating fluid that the chain comes in contact with. The baffle has a base with a planar side surface. A flange extends from the base, and extends radially about part of the transmission output and the differential input to follow the path of the chain. One end of the flange is provided with an opening to direct fluid through the opening, out of the baffle and into other regions of the transmission such as the transmission sump. This inhibits buildup of fluid in the sump of the baffle.

13 Claims, 5 Drawing Sheets

(56) References Cited

U.S. PATENT DOCUMENTS

| | | | | |
|---|---|---|---|---|
| 4,693,133 | A * | 9/1987 | Tomita | F16H 57/0006 184/6.12 |
| 5,033,989 | A * | 7/1991 | Shimaguchi | F16H 57/0421 184/11.5 |
| 6,000,373 | A * | 12/1999 | Woodhouse | F01M 1/02 123/196 M |
| 7,686,137 | B2 * | 3/2010 | Tominaga | F16H 57/0406 184/11.3 |
| 7,712,581 | B2 * | 5/2010 | Billings | F16H 57/0489 184/13.1 |
| 7,984,791 | B2 * | 7/2011 | Taguchi | F16H 57/0483 184/11.1 |
| 8,261,883 | B2 * | 9/2012 | Ariga | F16H 57/0423 184/13.1 |
| 8,328,668 | B2 * | 12/2012 | Ariga | F16H 57/0423 184/13.1 |
| 8,528,697 | B2 * | 9/2013 | Mordukhovich | F16H 57/0413 184/6.12 |
| 8,672,094 | B2 * | 3/2014 | Quehenberger | F16H 57/0419 184/6.12 |
| 8,701,837 | B2 * | 4/2014 | Yamamoto | F16H 7/06 184/11.1 |
| 8,875,841 | B2 * | 11/2014 | Yoshimi | F16H 3/006 184/6.12 |
| 8,919,500 | B1 * | 12/2014 | Kilcrease | F01M 9/06 184/11.5 |
| 9,046,166 | B2 * | 6/2015 | Neumeister | F16H 57/0409 |
| 9,528,593 | B2 * | 12/2016 | Tage | F16H 57/0423 |
| 9,631,715 | B1 * | 4/2017 | Steward | F16H 57/0423 |
| 9,638,313 | B2 * | 5/2017 | Steward | F16H 57/0423 |
| 2006/0060424 | A1 * | 3/2006 | Tominaga | F16H 57/0423 184/11.1 |
| 2006/0065487 | A1 * | 3/2006 | Tominaga | F16H 57/0406 184/6.12 |
| 2006/0179973 | A1 * | 8/2006 | Matsufuji | F16H 57/0447 74/606 R |
| 2008/0026893 | A1 * | 1/2008 | Yamamoto | F16H 7/06 474/91 |
| 2008/0128212 | A1 * | 6/2008 | Utzat | F16D 25/123 184/11.4 |
| 2010/0180721 | A1 * | 7/2010 | Quehenberger | F16H 57/0419 74/606 R |
| 2015/0337947 | A1 * | 11/2015 | Steward | F16H 57/0423 475/83 |
| 2016/0033028 | A1 * | 2/2016 | Tage | F16H 57/0423 475/160 |

* cited by examiner

BAFFLE FOR AUTOMOTIVE TRANSMISSION

TECHNICAL FIELD

This disclosure relates to a baffle assembly for an automotive transmission, in which the baffle is provided with structure to reduce the collection of transmission fluid in a sump of the baffle.

BACKGROUND

Conventional and hybrid vehicles alike typically require a transmission to provide speed and torque conversions from the engine to another device such as a differential, for example. Lubricating fluid or oil is necessary to reduce adverse side effects of friction and maintain operability of the moving parts within the transmission. The fluid circulates throughout the transmission via a pump and collects in a pan or sump at the bottom of the transmission housing.

In a typical transmission, a drive member such as a chain transfers torque from an output shaft to a differential, where the torque is distributed to the wheels of the vehicle. The drive member operates while being lubricated by a transmission fluid. A baffle can surround the drive member to provide sealing functions while containing a portion of the fluid. A flooding or collection of fluid in the baffle can result in frictional losses between the drive member and the fluid.

SUMMARY

In one embodiment, a transmission has a chain rotatably coupling an output of a transmission gearbox to an input of a differential. A baffle has a base with a planar side surface. The baffle has a flange extending from the side surface and having a first arcuate section partially extending about the output, and a second arcuate section partially extending about the input. The baffle also defines an opening in an end of the second arcuate section to direct fluid from the baffle into a transmission sump.

In another embodiment, a baffle for an automotive transmission includes a base with a planar side surface. A flange extends from the side surface and has a first arcuate section for partially extending about an output of a transmission gearbox, and a second arcuate section for partially extending about an input of a differential. A wall extends from the side surface and spaced from an end of the flange at the second arcuate section.

In another embodiment, a vehicle includes a chain that couples an output of a transmission gearbox to an input of a differential. A baffle partially surrounds a portion of the chain for deflecting lubrication. The baffle has a linear section between the input and the output, and an arcuate section partially extending radially about the input. The arcuate section defines an opening at one end thereof to inhibit the lubrication from accumulating in a sump of the baffle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIGS. 1-5 described below illustrate a baffle assembly located in a transmission, partially covering a drive member (e.g., belt, chain, etc.) that transmits power from an output of a transmission gearbox to an input of a differential. The differential splits and transmits the force to wheels of the vehicle. The components shown in the figures can be located between a transmission housing and a differential housing that mount to one another within a vehicle. Lubricating fluid circulates through the gearbox and differential of the transmission and drains into a transmission sump. The baffle assembly segregates the drive member from the transmission sump. While the context of the disclosure below regarding the baffle assembly is particularly focused with application in a vehicle transmission, it should be understood that the features of the baffle assembly may be implemented in any context in a vehicle in which a drive member circulates fluid.

Figure 6:
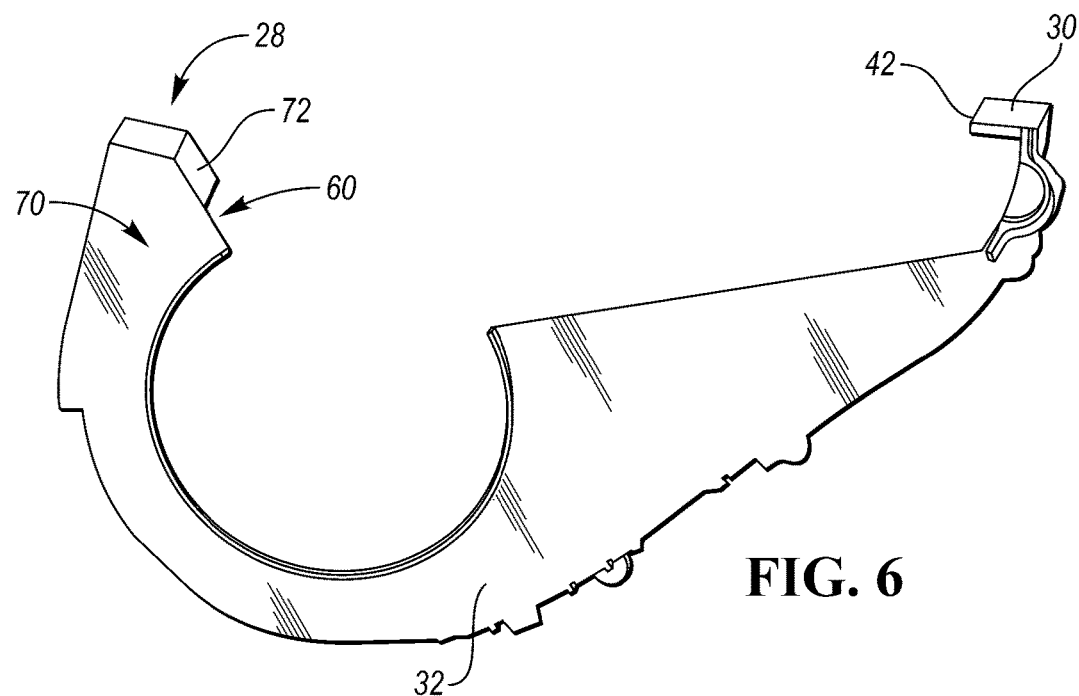
FIG. 6 is a top perspective view of the baffle in isolation, according to one embodiment.
Figure 7:
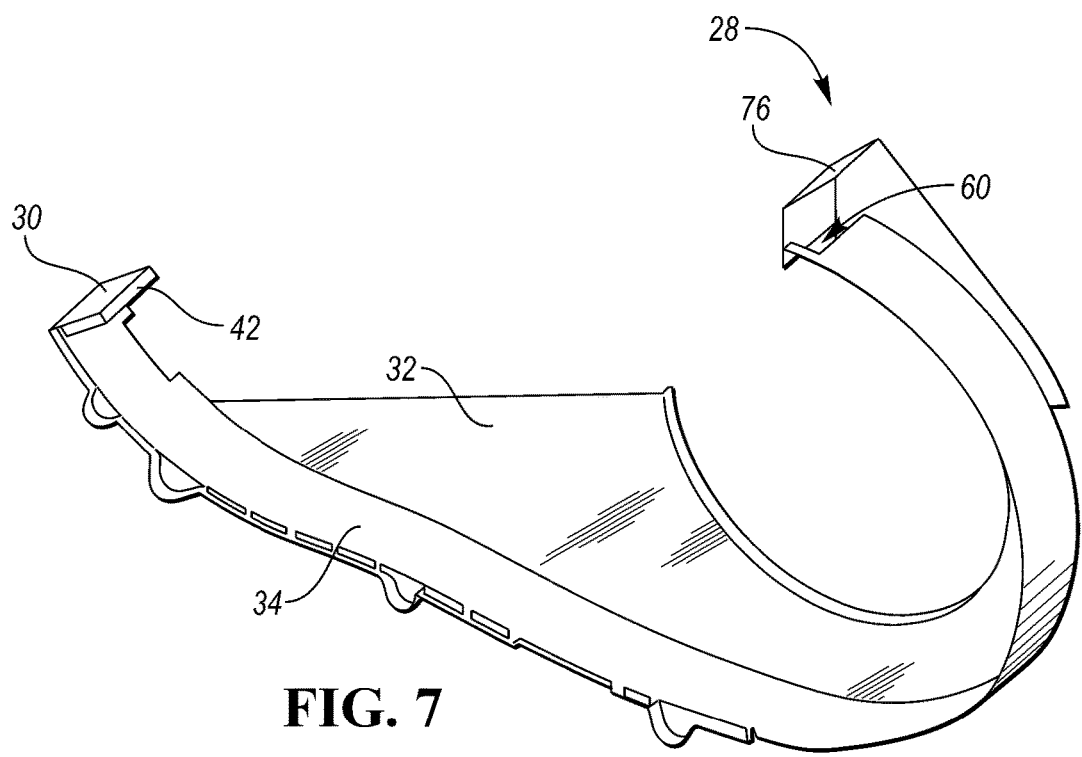
FIG. 7 is a bottom perspective view of the baffle in isolation, according to one embodiment.

FIGS. 1-5 illustrate a baffle assembly 10. FIGS. 6-7 illustrate one of the baffles in isolation for clarity. The baffle assembly may include a first baffle 12 and a second baffle 14 attachable to the first baffle 12 by, for instance, pegs, pins, or fasteners through connecting holes 16. The baffle assembly 10 partially surrounds and sheathes a torque transfer member, or drive member 18. The drive member 18 transfers rotational power from an output of a transmission gearbox (not shown) to an input 20 of a differential 22. The drive member 18 can be a chain that interacts with teeth on the differential input. In another embodiment, the drive member 18 is a belt.

The drive member 18 operates in lubricating fluid, for example, transmission fluid that exits the transmission gearbox. The fluid can collect within a baffle sump, defined between the first baffle 12 and the second baffle 14, which can collect fluid at a low point 26. Collected fluid in the baffle's sump can cause splashing or aeration of the lubricating fluid in the baffle sump. In particular, when the sump is flooded or includes standing lubricating fluid therein, the fluid can be propelled throughout the transmission, between the transmission housing and differential housing. This can cause excess circulation of the fluid and exposure of the fluid and the components within the transmission. Additionally, collected fluid in the baffle sump can place unnecessary and unwanted drag on the drive member 18. The sump can be provided with a drain hole at the low point 26 to allow the fluid to drain, but the fluid may not drain quickly enough under certain operating conditions.

Accordingly, various embodiments of this disclosure provide a scoop portion, or scoop 28, at one end of the baffle assembly 10. The scoop 28 is located radially outward from the drive member 18 to redirect fluid out of the baffle. As will be further described below, the scoop 28 collects accumulated fluid in the baffle sump and redirects the fluid into different areas of the transmission, such as the transmission sump. Additionally, according to various embodiments, the baffle assembly includes a wall 30 at an opposite end from the scoop 28. The wall 30 can also redirect the fluid such that the fluid exits the baffle and enters the transmission sump.

Detailed description of the chamber is provided below. But first, a description of the wall 30 and its surrounding structure is provided for context. The wall 30 extends from one end of the first baffle 12. The first baffle 12 has a base portion 32 having a generally planar side surface that defines one side boundary of the baffle assembly. The base portion 32 is located directly outboard from the drive member 18 and at least partially encircles the differential input 20. A flange 34 extends from the base portion 32. The flange 34 can extend from one end to the other end of the first baffle 12. The flange 34 has a first arcuate section 36 which partially encircles or surrounds a portion of the output of the transmission gear box. In other words, the first arcuate section 36 is curved to follow the general contour of the drive member 18 as it travels around the transmission gear box. A second arcuate section 38 of the flange 34 partially encircles or surrounds a portion of the input of the differential 22. In other words, the second arcuate section 38 is curved to follow the general contour of the drive member 18 as it travels around the differential 22. A linear section 40 extends between and connects the first arcuate section 36 and second arcuate section 38.

The end of the first arcuate section 36 is provided with the wall 30. The wall is provided with an end surface 42 that is directly adjacent to the drive member 18. In one embodiment, the end surface 42 touches the drive member 18 as the drive member 18 rotates. In other embodiments, the end surface 42 is located 1-10 mm from the outer surface of the drive member 18. The end surface 42 allows the wall 30 to act as a wiper to remove the fluid that transfers along with the rotating drive member 18. This inhibits the fluid from traveling further and being deposited into the baffle sump.

Figure 1:
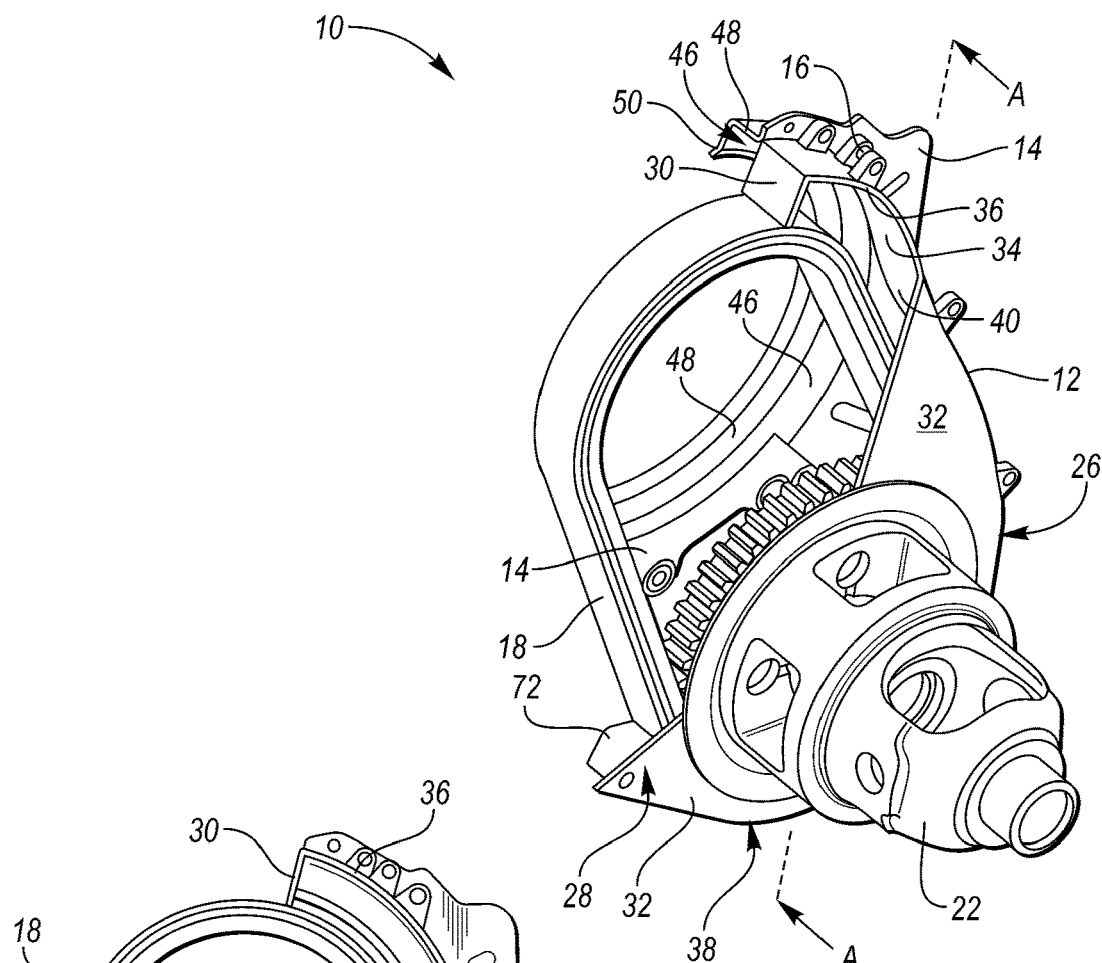
FIG. 1 is a perspective view of a baffle assembly partially surrounding a drive member driving a differential, according to one embodiment.
Figure 2:
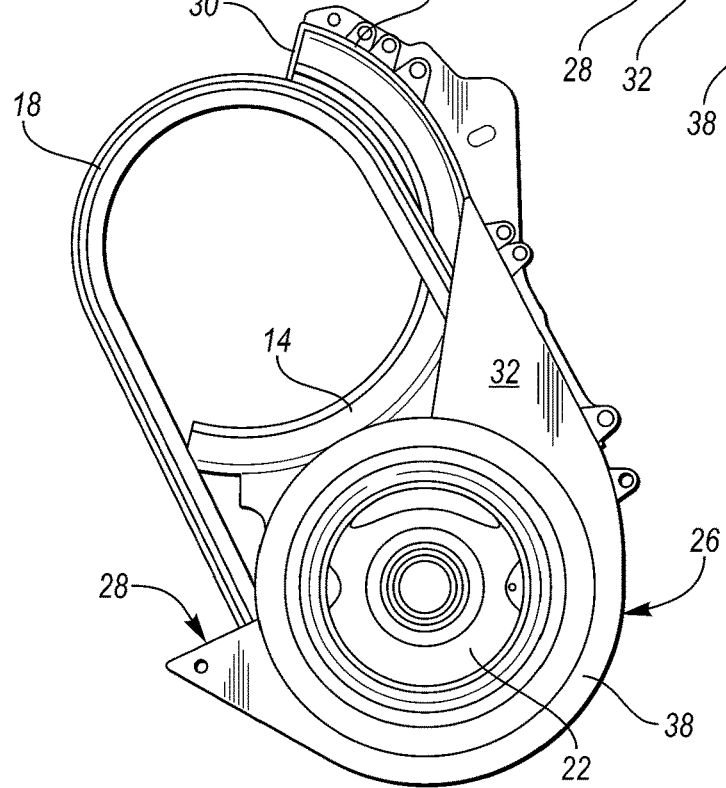
FIG. 2 is a top view of the assembly of FIG. 1.
Figure 3:
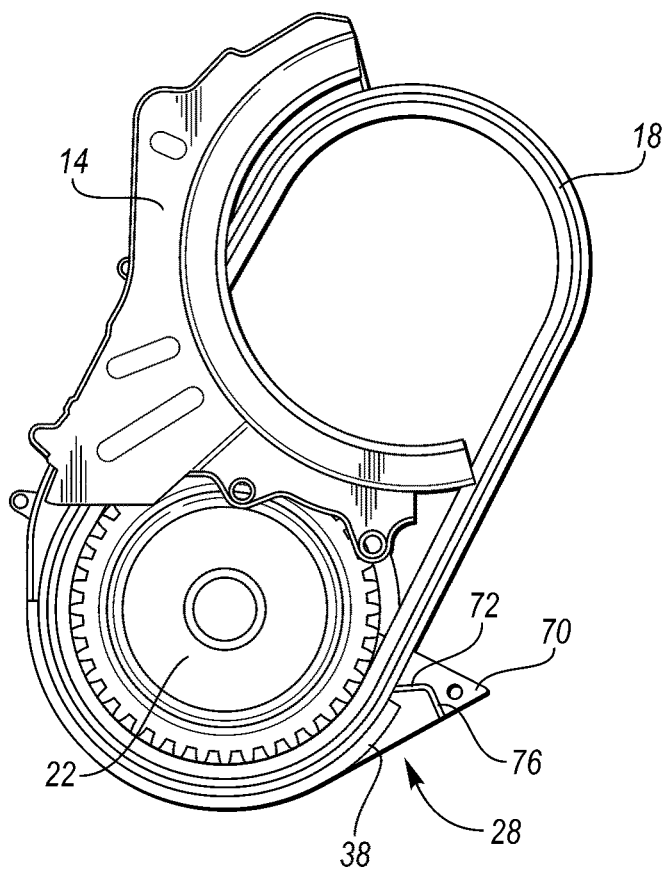
FIG. 3 is a bottom view of the assembly of FIG. 1.
Figure 4:
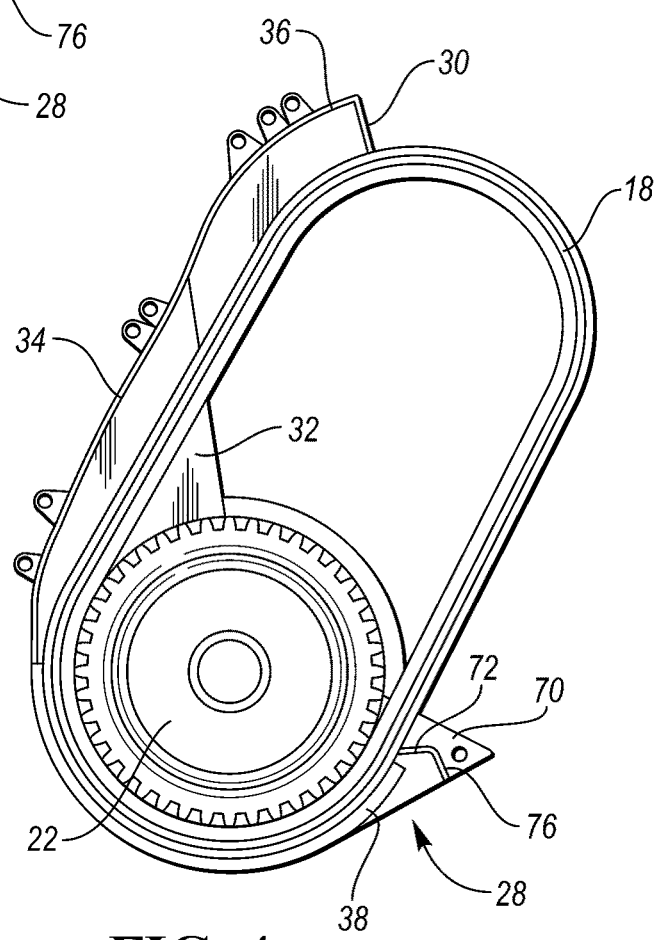
FIG. 4 is a bottom view of the assembly of FIG. 1, with one of the baffles removed.
Figure 5:
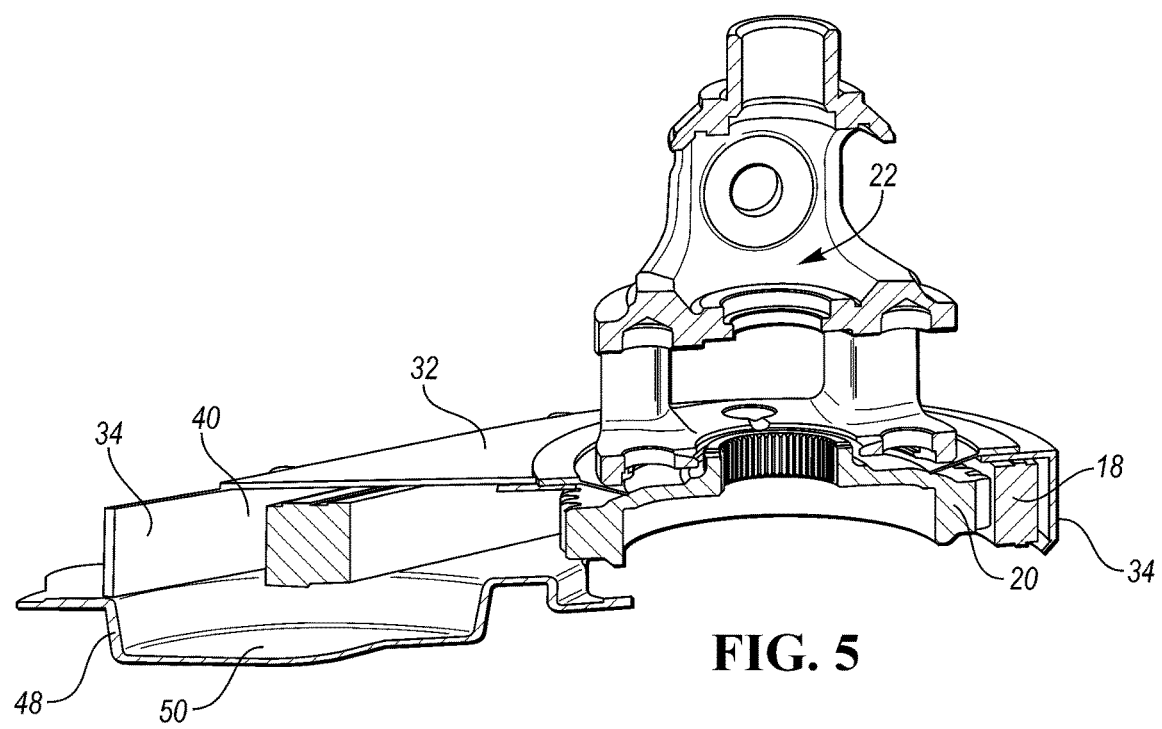
FIG. 5 is a cross-sectional perspective view taken along line A-A in FIG. 1.

Other regions are also provided for depositing the fluid as it is removed from the drive member by the wiper. For example, the first baffle 12 can include an open region between the base 32 and the wall 30. Also, the second baffle 14 can define a second open region 46. This open region 46 is provided by a flange 48 that follows and encircles a portion of the output of the transmission gearbox. As seen in FIG. 1, the flange 48 extends away from the wall 30 in a direction toward the transmission. A lip 50 extends from the flange 48.

At an opposite end of the baffle assembly from the wall 30 is the scoop 28. The scoop 28 is radially outward from the flange 34 from the differential input 20. The scoop 28 is accessed through an opening 60 in the flange 34, or a space between the end of the flange 34 and an end wall 72 of the scoop 28. During operation of the drive member 18, the fluid hits the end wall 72 and is directed into the opening 60. The fluid then travels outside of the flange 34, thereby removing the fluid from the confines of the baffle assembly, allowing the fluid to travel to other regions of the transmission. This reduces fluid buildup in the baffle sump, which can cause drag on the drive member 18.

Referring to FIGS. 6-7 in particular, the scoop 28 is defined in part by an extension portion 70 that extends from the base 32 in a co-planar relationship. A dam, or end wall 72, extends perpendicularly from the extension portion 70. The end wall 72 has a contact surface 74 at an end of the end wall 72 that faces the drive member 18. The end wall 72 and contact surface 74 impedes the fluid from traveling any further around the differential. The contact surface 74 may provide a resisting force against the fluid on the drive member 18 to force a portion of the fluid to be removed from the drive member 18 and through the opening 60. In this fashion, the end wall 72 acts as a wiper to remove fluid from the drive member 18 and displace it outside of the baffle assembly through the opening 60 during operation of the drive member.

In particular, during operation, the lubricating fluid is splashed around the baffle assembly by the drive member 18. The fluid can contact the end wall 72, at which time the fluid is forced through opening 60. The fluid can then travel along the interior of the end wall 72, and can contact roof surface 76. The fluid then exits the baffle assembly without being collected in the sump within the baffle assembly.

Figure 8:
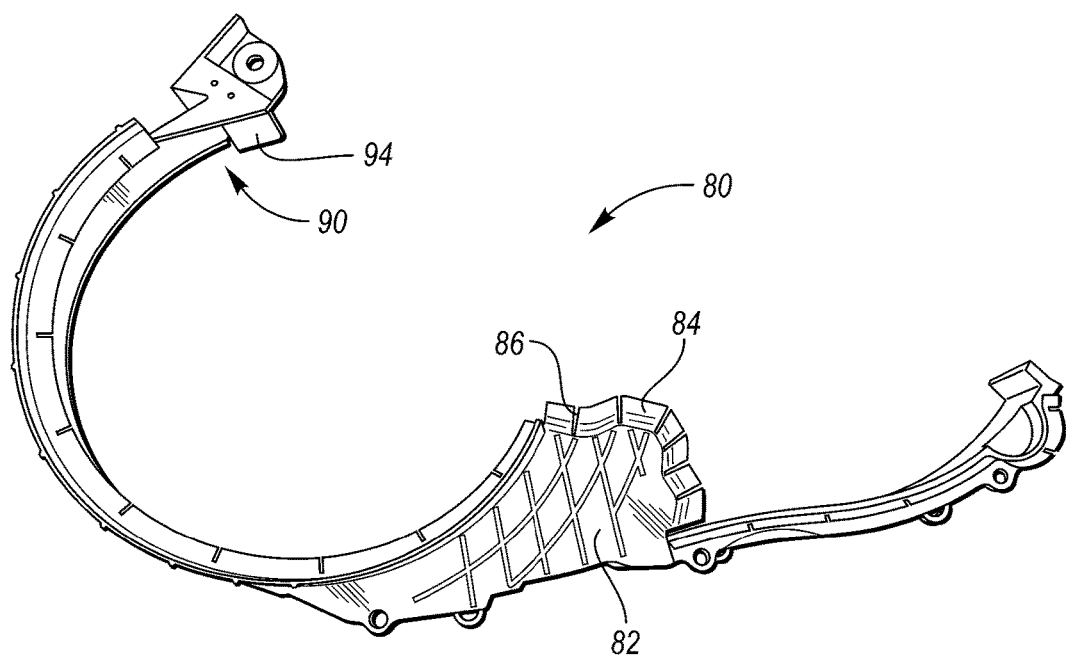
FIG. 8 is a front side view of a baffle according to another embodiment.
Figure 9:
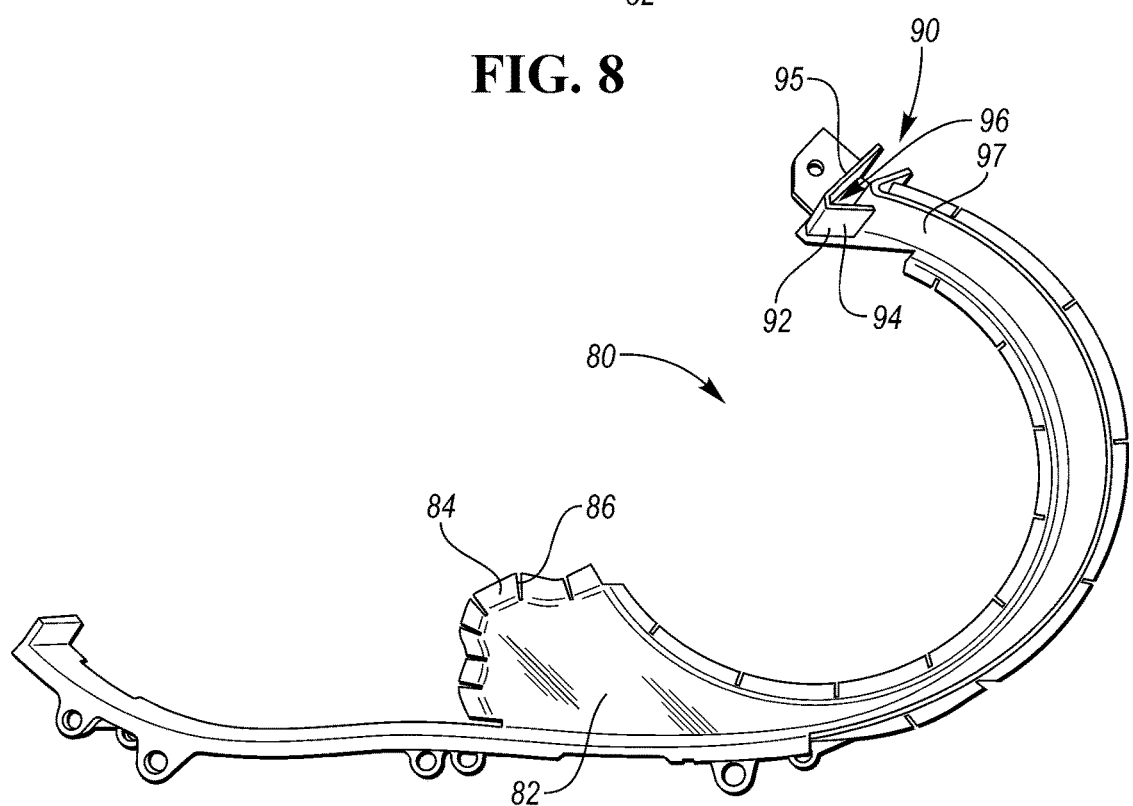
FIG. 9 is a back side view of the baffle of FIG. 7.

FIGS. 8-9 illustrate another embodiment of one of the baffles 80 of a baffle assembly. The baffle 80 has similar structure as the previous embodiment except where described herein. The baffle 80 includes a base 82 with stiffening ribs 84 that help stiffen the base 82 while still allowing relative flexibility for assembly. The base 82 has a plurality if fins 84 extending therefrom to form a common lip. The fins of the lip can be separated by a plurality of slits 86. The slits may be cuts, slots or pockets that extend either partially or entirely through the thickness of the lip. The slits 86 enable the individual fins 84 to flex and bend relative to one another, along the entire lip to provide a proper seal against the transmission fluid pump. The fins 84 may be pressed against a portion of the pump (e.g., a flange) that extends about a perimeter of the pump. This provides a seal or sealing surface between the fluid sump and the rotating components within the baffle assembly.

The baffle 80 also has a scoop portion 90 at one end. The scoop 90 is located radially outward from the drive member 18 to redirect fluid out of the baffle. The scoop 90 collects accumulated fluid in the baffle sump and redirects the fluid into different areas of the transmission, such as the transmission sump. To do so, the scoop 90 has a projection 92 that is angular to form a corner between a first portion 94 and a second portion 95. Some of the fluid traveling in the baffle assembly hits the inwardly-facing surface of the first portion 94 and is sent toward the differential 22. However, some of the fluid will pass within a gap or opening 96 between the projection 92 and the rounded outer portion 97 of the baffle. This fluid is then directed radially outward from the differential 22, where it exits the baffle at a location outside of the differential. This causes the fluid to return to the sump on the outside of the baffle rather than returning to interior portions of the baffle that can interfere with rotation of the drive member 18.

Although FIGS. 1-7 show an embodiment of one baffle, and FIGS. 8-9 show another embodiment of another baffle, it should be understood that certain features of each embodiment can be combined to form a new, unillustrated embodiment according to the skillsets of one of skill in the art. In other words, the first embodiment of FIGS. 1-7 and the second embodiment of FIGS. 8-9 should not be limiting as the only two embodiments contemplated within the scope of this disclosure.

It should be understood that the differential can be any differential that selectively distributes torque to the wheels, such as a limited slip differential (LSD), or electronic limited slip differential (eLSD). Similarly, while the gearbox is preferably includes a plurality of planetary gearsets, the gearbox can include other known transmission structure such as, for example, a continuously variable transmission (CVT).

Additional structure and operation of the baffle and surrounding structure is provided in U.S. application Ser. No. 15/435,749, which is filed on the same day as this disclosure, and which is incorporated by reference herein While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A transmission comprising:
   a chain rotatably coupling an output of a transmission gearbox to an input of a differential; and
   a baffle having
      a base having a planar side surface,
      a flange extending from the side surface and having a first arcuate section partially extending about the output, and a second arcuate section partially extending about the input,
      an opening in an end of the second arcuate section to direct fluid from the baffle into a transmission sump, and
      an end wall at an end of the first arcuate section that extends radially inward from and perpendicular to the flange, wherein the end wall contacts fluid on the chain to remove fluid from the chain as the chain rotates.

2. The transmission of claim 1, wherein the side surface includes an arcuate section extending about the input, and an extension portion extending radially outward from and co-planar with the arcuate section.

3. The transmission of claim 2, further comprising a wall extending from the extension portion and adjacent to the opening, wherein the wall directs fluid through the opening.

4. The transmission of claim 3, wherein the wall defines an end surface adjacent to the chain to remove fluid from the chain as the chain rotates.

5. The transmission of claim 3, wherein the second arcuate section of the flange does not extend circumferentially beyond the wall.

6. The transmission of claim 1, wherein the second arcuate section extends further about the input than the first arcuate section extends about the output.

7. A baffle for an automotive transmission, comprising:
   a base having a planar side surface;
   a flange extending from the side surface and having a first arcuate section for partially extending about an output of a transmission gearbox, and a second arcuate section for partially extending about an input of a differential;
   a wall extending from the side surface and spaced from an end of the flange at the second arcuate section;
   a second wall extending from the flange at the first arcuate section, wherein the first arcuate section ends at the second wall, and the second wall defines an end surface for contacting fluid on a chain that couples the output to the input to remove fluid from the chain as the chain rotates.

8. The baffle of claim 7, wherein a gap is defined between the end of the flange and the wall to provide an opening for fluid to escape from the baffle.

9. The baffle of claim 7, wherein the wall extends perpendicularly from the side surface.

10. The baffle of claim 7, wherein the wall defines an end surface for contacting fluid on a chain that couples the output to the input to remove fluid from the chain as the chain rotates.

11. The baffle of claim 7, wherein the second arcuate section of the flange does not extend circumferentially beyond the wall.

12. A vehicle comprising:
   a chain coupling an output of a transmission gearbox to an input of a differential; and
   a baffle partially surrounding a portion of the chain for deflecting lubrication, the baffle having:
      a base with a generally planar side surface,
      a flange extending from the base,
      a linear section between the input and the output,
      an arcuate section partially extending radially about the input, the arcuate
      section defining an opening at one end to inhibit the lubrication from accumulating in a sump of the baffle, and
      a wall extending perpendicularly from the base and circumferentially spaced from the flange to define the opening between the wall and the flange, wherein the wall defines an end surface that contacts fluid on the chain to remove fluid from the chain as the chain rotates.

13. The vehicle of claim 12, wherein the baffle further includes a second arcuate section partially extending radially about the output, and a second wall extending radially inward from the second arcuate section toward the output.

* * * * *